United States Patent
Oogose et al.

(10) Patent No.: US 10,477,849 B2
(45) Date of Patent: Nov. 19, 2019

(54) DUAL-BEARING REEL

(71) Applicant: Shimano Inc., Sakai, Osaka (JP)

(72) Inventors: Hiroki Oogose, Osaka (JP); Takanori Maruoka, Osaka (JP); Kunio Takechi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/189,120

(22) Filed: Nov. 13, 2018

(65) Prior Publication Data

US 2019/0191682 A1   Jun. 27, 2019

(30) Foreign Application Priority Data

Dec. 27, 2017 (JP) .................................. 2017-250835

(51) Int. Cl.
*A01K 89/01* (2006.01)
*A01K 89/015* (2006.01)

(52) U.S. Cl.
CPC ...... *A01K 89/0189* (2015.05); *A01K 89/0193* (2015.05)

(58) Field of Classification Search
CPC ............ A01K 89/0188; A01K 89/0189; A01K 89/0191
See application file for complete search history.

(56) References Cited

U.S. PATENT DOCUMENTS

| 4,634,079 | A | * | 1/1987 | Furomoto | A01K 89/01907 242/249 |
| 4,798,355 | A | * | 1/1989 | Kaneko | A01K 89/0189 242/261 |
| 5,443,219 | A | * | 8/1995 | Hashimoto | A01K 89/0117 242/300 |
| 5,489,070 | A | * | 2/1996 | Puryear | A01K 89/01916 242/261 |
| 5,615,844 | A | * | 4/1997 | Bosch | B65H 75/406 242/395 |
| 2015/0296762 | A1 | * | 10/2015 | Haraguchi | A01K 89/015 242/261 |

FOREIGN PATENT DOCUMENTS

JP     2575471 Y2     4/1998
JP  2008271874 A  * 11/2008  ............. A01K 89/01

* cited by examiner

*Primary Examiner* — Emmanuel M Marcelo
(74) *Attorney, Agent, or Firm* — Global IP Counselors, LLP

(57) ABSTRACT

A dual-bearing reel includes a handle, a spool, a spool shaft, a clutch mechanism, a pinion gear, and an elastic member. The spool shaft is connected to the spool to be integrally rotatable and has a first abutting portion. The pinion gear has a second abutting portion to abut the first abutting portion in the axial direction in the inner circumferential portion thereof, and can move in the axial direction between a coupled position, in which the pinion gear is connected to the spool shaft so as to be integrally rotatable, and a decoupled position, in which the connection is disconnected. When the pinion gear is in the coupled position, the elastic member contacts the distal end of the pinion gear and biases the first abutting portion and the second abutting portion in directions away from each other.

7 Claims, 6 Drawing Sheets

DUAL-BEARING REEL

CROSS-REFERENCE TO RELATED APPLICATIONS

This application claims priority to Japanese Patent Application No. 2017-250835, filed on Dec. 27, 2017. The entire disclosure of Japanese Patent Application No. 2017-250835 is hereby incorporated herein by reference.

BACKGROUND

Field of the Invention

The present invention relates to a dual-bearing fishing reel.

Background Art

Dual-bearing reels include a clutch mechanism for transmitting and preventing the rotational force of a handle. The clutch mechanism is generally disposed between the spool shaft and a pinion gear. The pinion gear can move in the axial direction between a coupled position, in which the pinion gear is connected to the spool shaft so as to be integrally rotatable, and a decoupled position, in which the connection with the spool shaft is released. The pinion gear meshes with a drive gear, to which the rotational force of the handle is transmitted (refer to Japanese Utility Model Registration No. 2575471).

In the dual-bearing reel disclosed in Japanese Utility Model Registration No. 2575471, the spool shaft and the pinion gear have surfaces that are opposite to each other in the axial direction. When the pinion gear is in the coupled position, an elastic member is sandwiched between these mutually opposing surfaces to suppress rattling caused by the engagement between the spool shaft and the pinion gear when the handle is operated.

In the clutch mechanism disclosed in Japanese Utility Model Registration No. 2575471 the elastic member is sandwiched between the mutually opposing surfaces of the spool shaft and the pinion gear, so when, for example, the handle is rotated at high speed and a load in a thrust direction is applied to the pinion gear, the elastic member repeatedly expands and contracts, and the axial position of the pinion gear is not fixed. In a state in which a large load is applied to the pinion gear, if the elastic member contracts and the pinion gear moves in the axial direction, the meshing between the pinion gear and the drive gear becomes unstable, and the meshing between the pinion gear and the drive gear can be subject to interference, so that the pinion gear is severely abraded. In addition, if the elastic member were not disposed in the clutch mechanism of Japanese Utility Model Registration No. 2575471, the mutually opposing sides of the spool shaft and the pinion gear could collide and an abnormal noise could be generated.

SUMMARY

An object of the present invention is to prevent the generation of the abnormal noise caused by the collision of the spool shaft and the pinion gear, and to stabilize the meshing between the pinion gear and the drive gear, even if a load is applied to the pinion gear.

The dual-bearing reel according to the present invention comprises a reel body, a handle, a spool, a spool shaft, a clutch mechanism, a pinion gear, and an elastic member. The handle is rotatable relative to the reel body. The spool is rotatable relative to the reel body. The spool shaft is connected to the spool so as to be rotatable therewith, and has a first abutting portion. The clutch mechanism transmits and prevents the rotational force from the handle to the spool. The pinion gear is configured in such a way that the spool shaft passes through the inner circumferential portion thereof, and, in the axial direction of the spool shaft, the pinion gear moves between a coupled position, in which the pinion gear is connected to the spool shaft so as to be integrally rotatable therewith, and a decoupled position, in which the connection with the spool shaft is released. The pinion gear has a second abutting portion that can abut the first abutting portion in the axial direction at the inner circumferential portion. When the pinion gear is in the coupled position, the elastic member contacts with the distal end of the pinion gear and biases the first abutting portion of the spool shaft and the second abutting portion of the pinion gear in directions away from each other.

In this dual-bearing reel, it is possible to prevent abnormal noises caused by a collision between the spool shaft and the pinion gear when the pinion gear is in the coupled position, since the first abutting portion of the spool shaft and the second abutting portion of the pinion gear are biased in directions away from each other by the elastic member. In addition, when a large load in the thrust direction is applied to the pinion gear that is in the coupled position, the axial position of the pinion gear can be positioned with the first abutting portion, which can abut the second abutting portion. As a result, axial movement of the pinion gear under a large load state is prevented, and the meshing of the pinion gear and the gear that meshes with the pinion gear is stable.

Preferably, the spool shaft has a recess formed so as to be recessed in the radial direction in which the elastic member is mounted. Thus, it is a simple matter to attach the elastic member.

Preferably, the recess of the spool shaft has an inclined portion whose outer diameter gradually decreases toward the coupled position, and the elastic member is slidable in the recess and biased toward the decoupled position by the inclined portion of the recess. In this embodiment, when a large load is applied to the pinion gear and the force with which the pinion gear presses against the elastic member is large, the elastic member moves together with the pinion gear. Thus, it is relatively simple for the second abutting portion of the pinion gear to be positioned with the first abutting portion of the spool shaft.

Preferably, when the pinion gear is in the coupled position, the elastic member contacts the inner circumferential surface of the distal end of the pinion gear to bias the pinion gear radially outward. In this embodiment, it is possible to suppress contact between the spool shaft and the pinion gear in the radial direction.

Preferably, the second abutting portion of the pinion gear is a stepped portion disposed on the inner circumferential portion.

Preferably, the elastic member is an O-ring.

Preferably, the spool shaft further comprises an engagement pin that protrudes in the radial direction, and the pinion gear has an engagement recess that engages the engagement pin when in the coupled position.

According to the present invention, the generation of abnormal noise caused by the collision between the spool shaft and the pinion gear can be prevented, movement of the pinion gear in the axial direction when load is applied to the pinion gear can be prevented, and the meshing of the pinion gear and the drive gear can be stabilized.

DETAILED DESCRIPTION OF THE EMBODIMENTS

Figure 1:
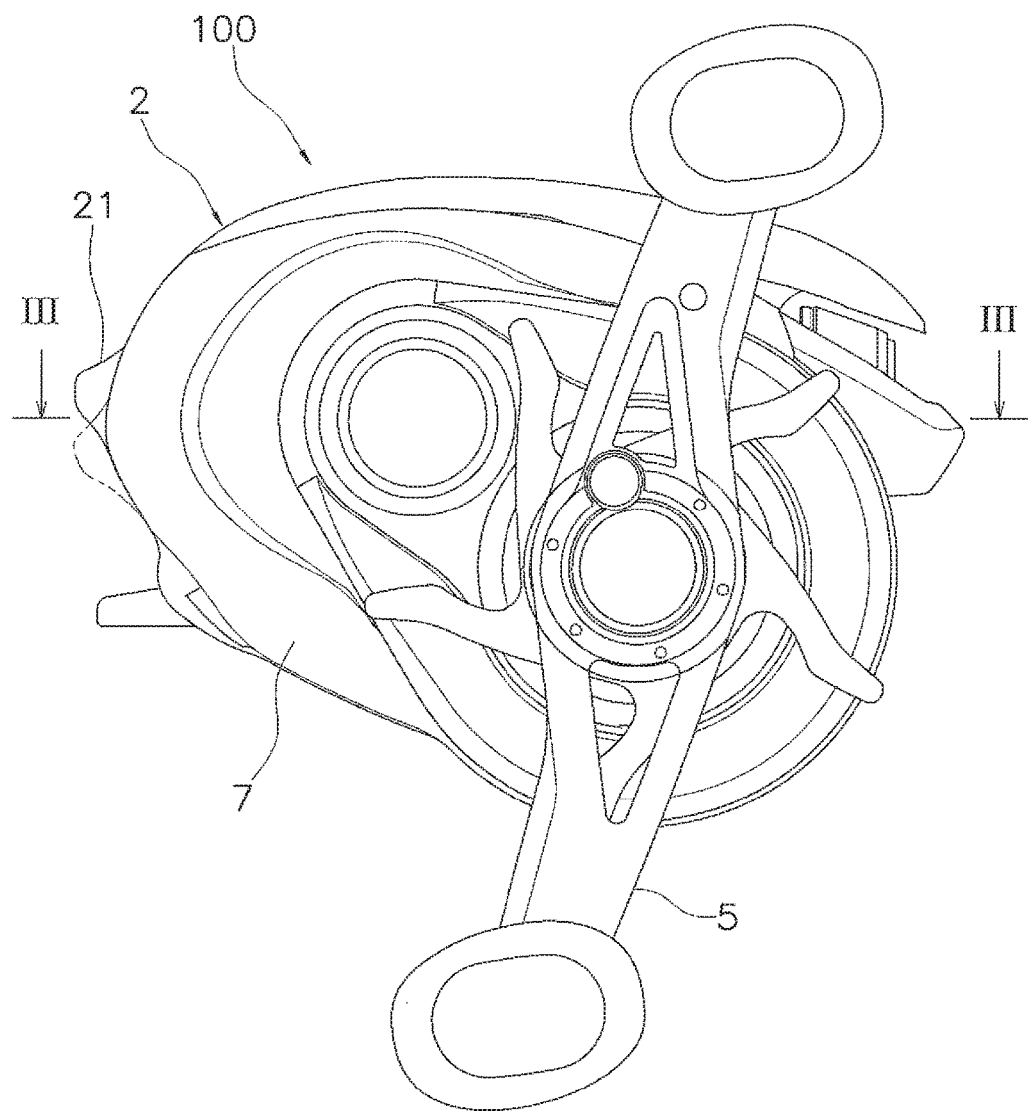
FIG. 1 shows a side view of a dual-bearing reel employing a first embodiment of the present invention.
Figure 2:
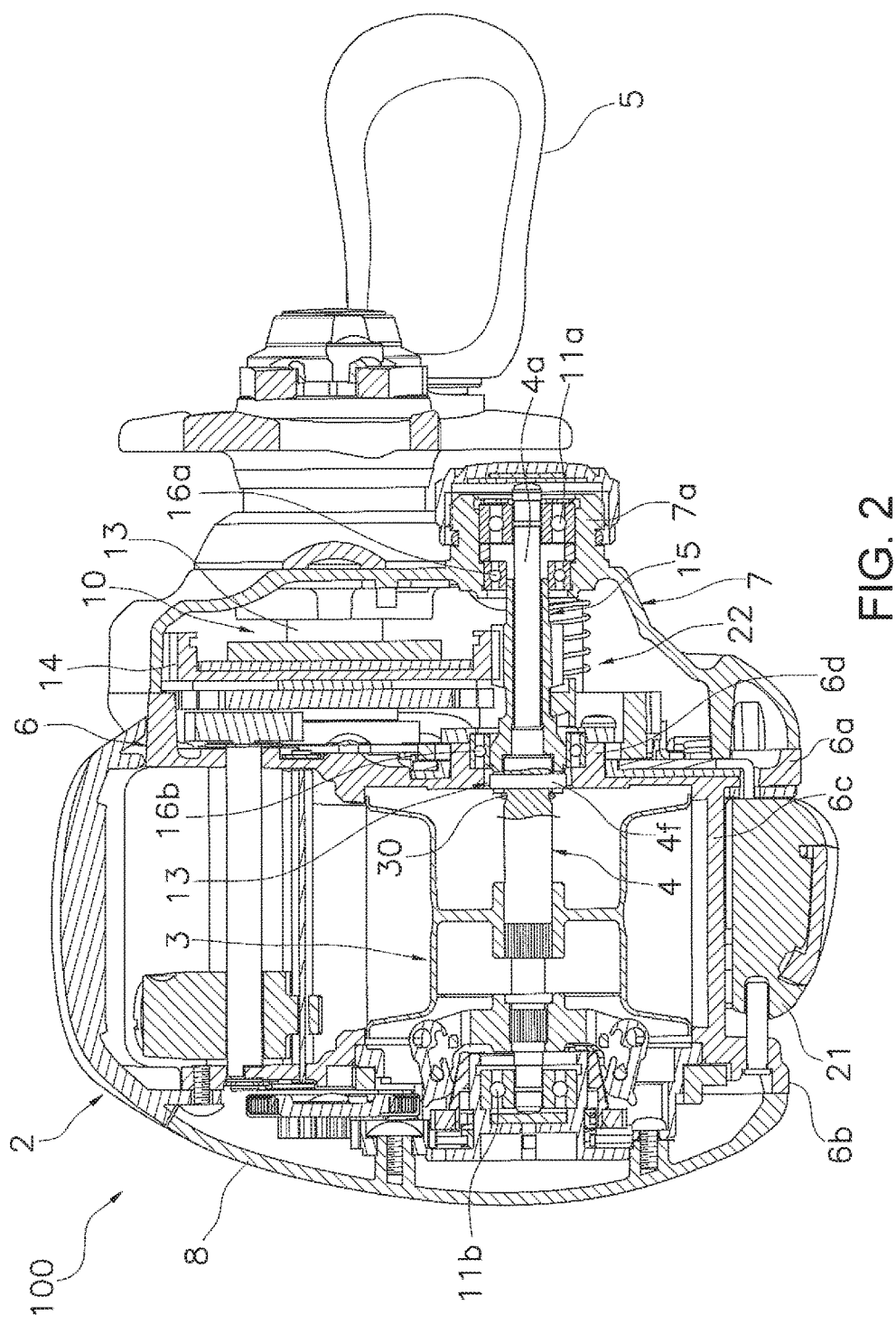
FIG. 2 shows a cross section through line III-III in FIG. 1.

As shown in FIGS. 1 and 2, a dual-bearing reel 100 in which one embodiment of the present invention is employed comprises a reel body 2, a spool 3, a spool shaft 4, a handle 5, a rotation transmission mechanism 10, a clutch mechanism 20, and an elastic member 30. FIG. 1 is a side view of the reel body 2 as seen from the handle 5 side.

In the following description, the direction in which a fishing line is cast (unreeled) during fishing is referred to as the front, and the opposite direction is referred to as the rear. Additionally, left and right refer to left and right when the dual-bearing reel 100 is seen from the rear. In addition, the direction in which the spool shaft 4 extends is referred to as the axial direction. Additionally, the direction that is orthogonal to the direction in which the spool shaft 4 extends is referred to as the radial direction.

As shown in FIG. 2, the reel body 2 comprises a frame 6, a first side cover 7, and a second side cover 8. The frame 6 has a first side plate 6a, a second side plate 6b, and a plurality of connecting portions 6c. The first side plate 6a is disposed on the right side of the frame 6. The first side plate 6a has a first boss portion 6d. The second side plate 6b is disposed on the left side of the frame 6, spaced apart from the first side plate 6a in the axial direction. The plurality of connecting portions 6c extend in the axial direction and connect the first side plate 6a and the second side plate 6b.

The first side cover 7 covers the right side of the first side plate 6a of the frame 6. The first side cover 7 has a second boss portion 7a. The second side cover 8 covers the left side of the second side plate 6b of the frame 6.

The spool 3 is rotatable relative to the reel body 2. The spool 3 is rotatably supported on the reel body 2 between the first side plate 6a and the second side plate 6b.

The spool shaft 4 extends inside the reel body 2 in the axial direction and is connected to the spool 3 so as to rotate integrally therewith. The spool shaft 4 is rotatably supported on the reel body 2 via axle bearings 11a, 11b, disposed in the reel body 2.

Figure 3:
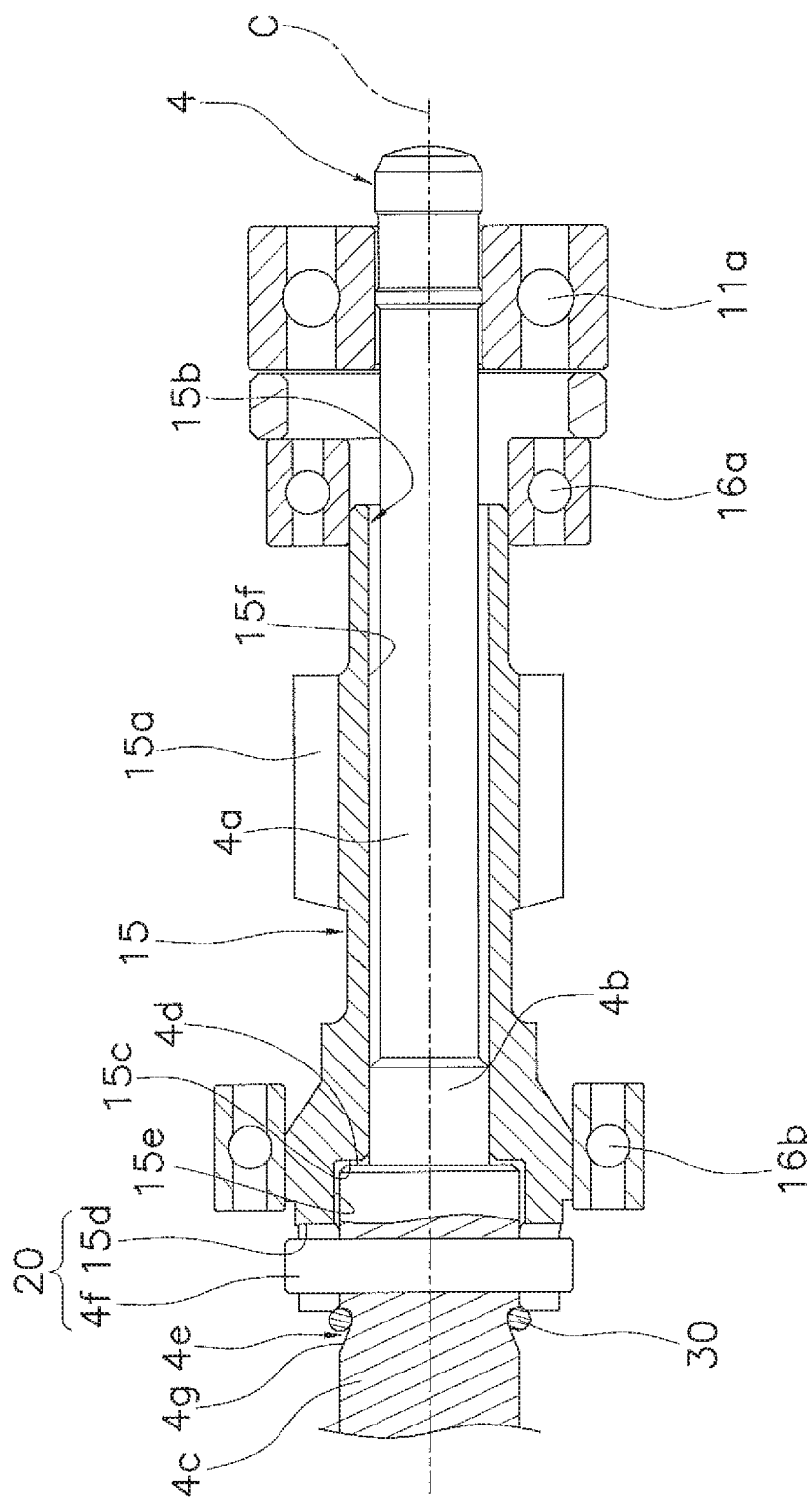
FIG. 3 shows a cross section when the pinion gear is in a coupled position.

As shown partially enlarged in FIG. 3, the spool shaft 4 has a first shaft portion 4a, a second shaft portion 4b, and a third shaft portion 4c. The first shaft portion 4a extends from one end of the spool shaft 4 inside the first side cover 7 in the axial direction (refer to FIG. 2). The second shaft portion 4b has a larger diameter than the outer diameter of the first shaft portion 4a and is formed adjacent to the first shaft portion 4a. The third shaft portion 4c has a larger diameter than the outer diameter of the second shaft portion 4b and is formed adjacent to the second shaft portion 4b.

The spool shaft 4 also has a first abutting portion 4d, a recess 4e, and an engagement pin 4f. The first abutting portion 4d is formed by a step in the radial direction between the second shaft portion 4b and the third shaft portion 4c.

The recess 4e is a groove disposed along the circumferential direction on the outer perimeter of the third shaft portion 4c and is recessed in the radial direction. The recess 4e has an inclined portion 4g that slopes so that the outer diameter gradually decreases toward the second shaft portion 4b. The inclined portion 4g is formed in a bottom portion of the recess 4e.

The engaging pin 4f is fixed to the third shaft portion 4c. The engagement pin 4f passes through the third shaft portion 4c in the radial direction with both ends protruding from the spool shaft 4 in the radial direction. The engaging pin 4f is a part of the clutch mechanism 20.

As shown in FIG. 1, the handle 5 is rotatable relative to the reel body 2 and is rotatably supported by the reel body 2.

The rotation transmission mechanism 10 transmits the rotation of the handle 5 to the spool 3. As shown in FIG. 2, the rotation transmission mechanism 10 comprises a drive shaft 13, a drive gear 14, and a pinion gear 15. The drive shaft 13 is connected to the handle 5 so as to be integrally rotatable. The drive gear 14 is attached to the drive shaft 13. The rotation of the handle 5 is transmitted to the drive gear 14 via a drag mechanism, not shown, which is disposed inside the first side cover 7. The pinion gear 15 meshes with the drive gear 14. The drive shaft 13 can rotate only in the line-winding direction by a one-way clutch, not shown, which is disposed on the outer perimeter of the drive shaft 13.

As shown in FIGS. 2 and 3, the pinion gear 15 is a tubular member extending in the axial direction and has helical teeth 15a that mesh with the drive gear 14 on the outer perimeter. The spool shaft 4 extends through the inner circumferential portion of the pinion gear 15. The pinion gear 15 is supported by an axle bearing 16a disposed on the second boss portion 7a of the first side cover 7 as well as by an axle bearing 16b disposed on the inner circumferential portion of the first boss portion 6d of the first side plate 6a, so as to be rotatable about an axis C of the spool shaft 4 and to be movable in the axial direction.

Figure 4:
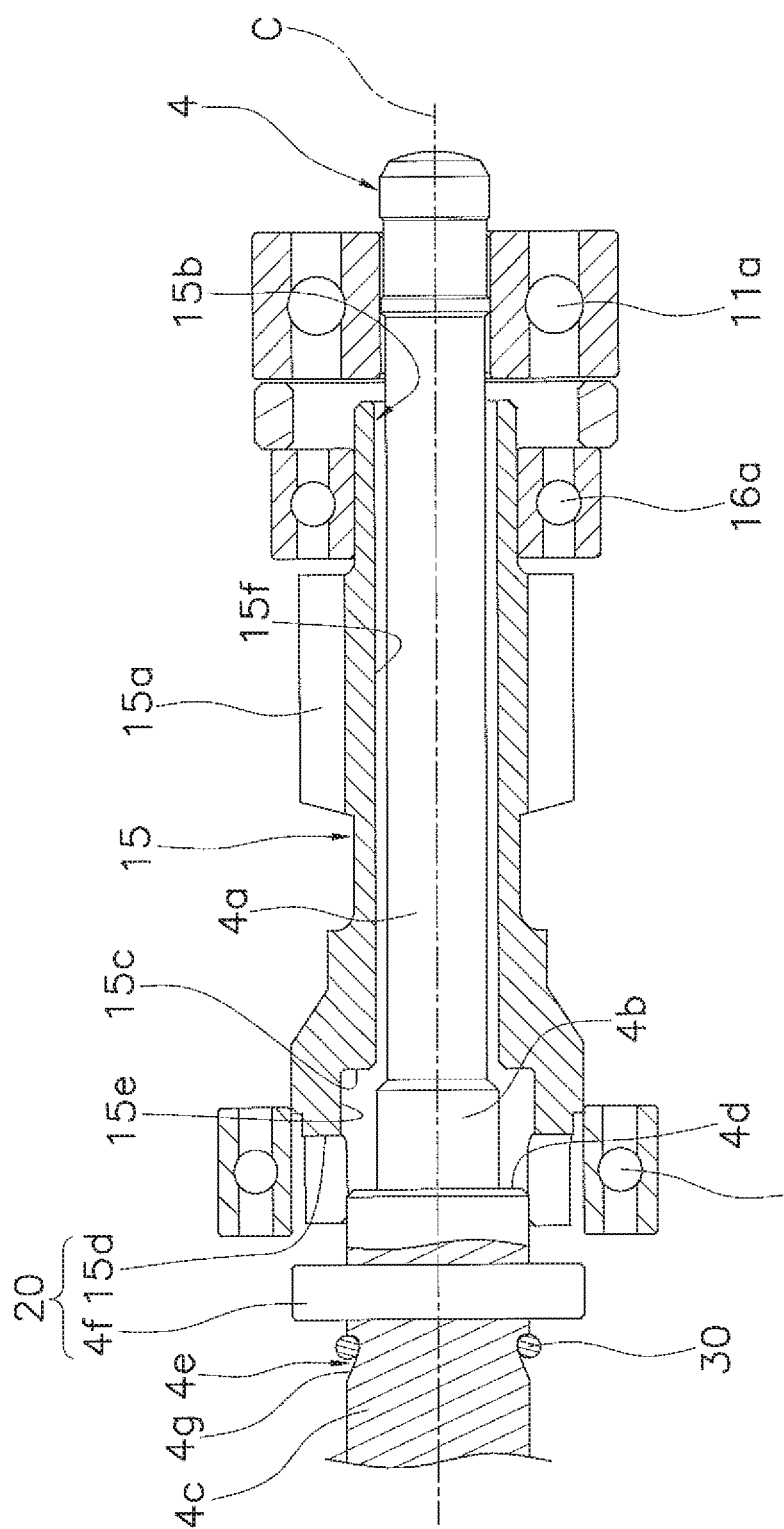
FIG. 4 shows a cross section when the pinion gear is in a decoupled position.

The pinion gear 15 can move in the axial direction between a coupled position, in which the pinion gear is connected to the spool shaft 4 so as to be integrally rotatable, and a decoupled position, in which the connection with the spool shaft 4 is disconnected. FIG. 3 shows the position of the pinion gear 15 in the coupled position, and FIG. 4 shows the position of the pinion gear 15 in the decoupled position.

The pinion gear 15 has a through-hole 15b, a second abutting portion 15c, and an engagement recess 15d. The through-hole 15b extends in the axial direction and has a large-diameter hole portion 15e and a small-diameter hole portion 15f.

The large-diameter hole portion 15e has an inner diameter that is larger than the outer diameter of the third shaft portion 4c of the spool shaft 4. When the pinion gear 15 is in the coupled position, an end portion of the third shaft portion 4c is housed in the large-diameter hole portion 15e with a gap therebetween. The small-diameter hole portion 15f is adjacent the large-diameter hole portion 15e. The small-diameter hole portion 15f has an inner diameter that is smaller than the outer diameter of the third shaft portion 4c of the spool shaft 4. In addition, the small-diameter hole portion 15f has an inner diameter that is larger than the outer diameter of the first shaft portion 4a and the second shaft portion 4b of the spool shaft 4, and a gap is disposed between the first shaft portion 4a and the second shaft portion 4b in the radial direction. This gap reduces the rotational resistance of the spool shaft 4 during casting.

The second abutting portion 15c is disposed on the outer circumferential portion of the pinion gear 15. In particular, the second abutting portion 15c is formed by a step in the radial direction between the large-diameter hole portion 15e and the small-diameter hole portion 15f. The second abutting portion 15c can abut the first abutting portion 4d of the spool shaft 4 in the axial direction in the inner circumferential portion of the pinion gear 15. As shown in FIG. 3, when the pinion gear 15 is in the coupled position, a gap is disposed between the first abutting portion 4d and the second abutting portion 15c in the axial direction.

The engagement recess 15d is engaged by the engagement pin 4f when the pinion gear 15 is in the coupled position. The engagement recess 15d is formed on an end portion of the pinion gear 15 that is adjacent to the engagement pin 4f. The engagement recess 15d is formed in the axial direction and a plurality of such recesses are formed along the radial direction. The engagement recess 15d is a part of the clutch mechanism 20.

The clutch mechanism 20 is a mechanism for transmitting and preventing the rotational force from being transmitted from the handle 5 to the spool 3. The clutch mechanism 20 is formed by the engaging pin 4f and the engagement recess 15d. When the clutch mechanism 20 is in the transmitting state, that is, when the pinion gear 15 is in the coupled position, the engagement pin 4f engages the engagement recess 15d, and the rotational force from the handle 5 is transmitted to the spool 3. When the clutch mechanism 20 is in the prevention state, that is, when the pinion gear 15 is in the decoupled position, the engagement pin 4f is disengaged from the engagement recess 15d, and the rotational force of the handle 5 is prevented from being transmitted to the spool 3.

As shown in FIGS. 1 and 2, the clutch mechanism 20 is switched between the transmitting state and the prevention state, from one to the other, by a clutch operating member 21 that is disposed in the rear portion of the reel body 2 and a clutch control mechanism 22 that is interconnected with the clutch operating member 21. Because the clutch operating member 21 and the clutch control mechanism 22 have the same configurations as in the prior art, the descriptions thereof have been omitted.

The elastic member 30 prevents abnormal noise that occurs when a load in the thrust direction is applied to the pinion gear 15, particularly when the handle is rotated at high rotational speeds and the first abutting portion 4d of the spool shaft 4 and the second abutting portion 15c of the pinion gear 15 repeatedly collide in the axial direction. As shown in FIG. 3, when the pinion gear 15 is in the coupled position, the elastic member 30 contacts the distal end of the pinion gear 15 and biases the first abutting portion 4d of the spool shaft 4 and the second abutting portion 15c of the pinion gear 15 in directions away from each other. Here, the distal end means the end portion of the pinion gear 15 that is adjacent to the engagement pin 4f, and, more specifically, the end surface of the pinion gear 15 excluding the engagement recess 15d.

The elastic member 30 is an elastic body made of an elastically deformable resin, or the like, for example an O-ring. The elastic member 30 is mounted in the recess 4e of the spool shaft 4 and protrudes farther outside in the radial direction than the third shaft portion 4c of the spool shaft 4. The elastic member 30 is slidable in the recess 4e and is biased toward the direction of the decoupled position (right side in FIG. 3) by the inclined portion 4g of the recess 4e.

In addition, when the pinion gear 15 is in the coupled position, the elastic member 30 contacts the inner circumferential surface of the distal end of the pinion gear 15 to bias the pinion gear 15 radially outward. By disposing the elastic member 30 so as to be able to come into contact with the inner circumferential surface of the distal end of the pinion gear 15, contact between the spool shaft 4 and the pinion gear 15 can be suppressed in the radial direction.

In the dual-bearing reel 100 configured as described above, the occurrence of abnormal noise due to collision between the first abutting portion 4d and the second abutting portion 15c when the pinion gear 15 is in the coupled position can be prevented, since the first abutting portion 4d of the spool shaft 4 and the second abutting portion 15c of the pinion gear 15 are biased in directions away from each other by the elastic member 30.

Figure 5:
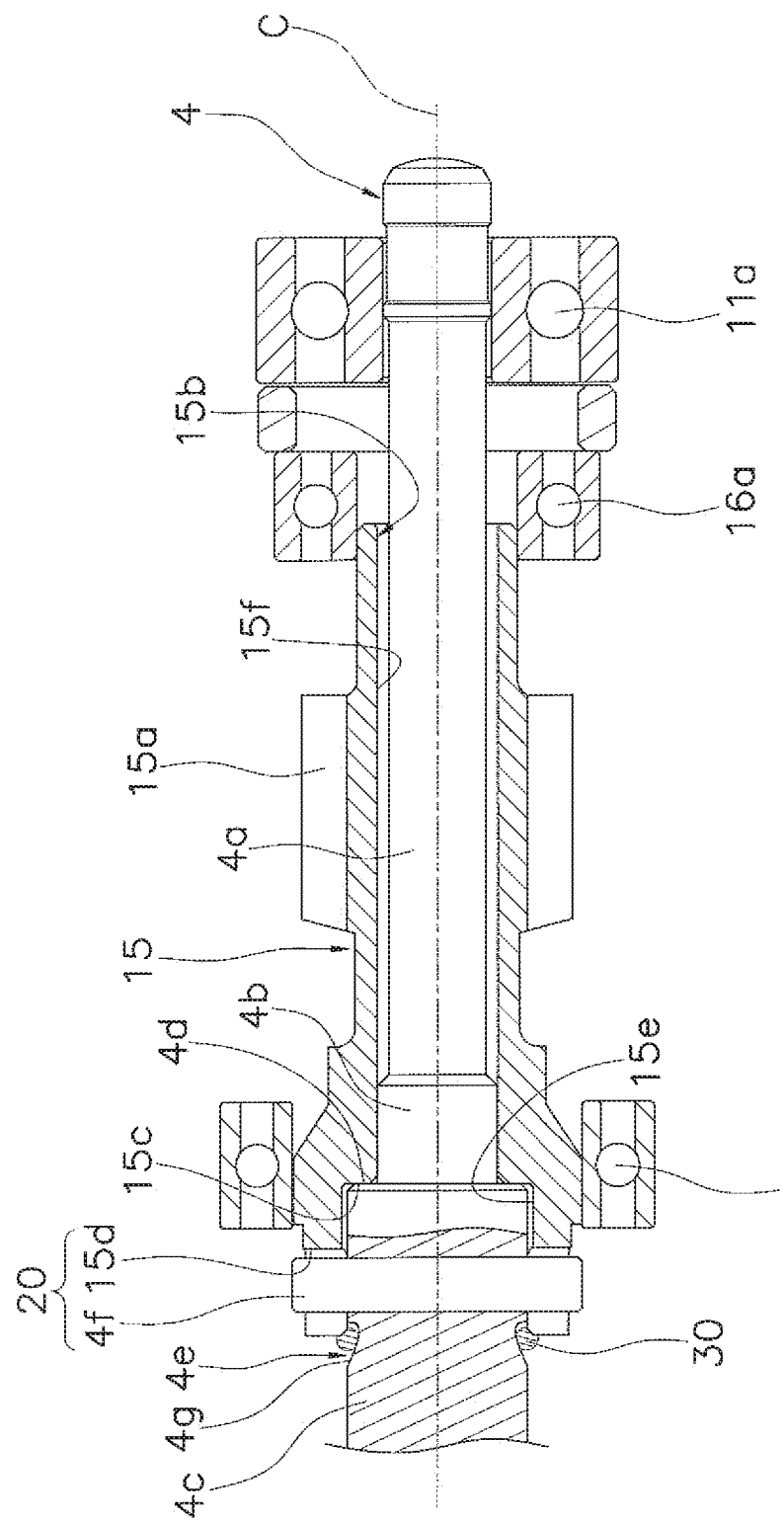
FIG. 5 shows a view corresponding to FIG. 3 of when the pinion gear is under load.

In addition, when a large load is applied to the pinion gear 15 when the pinion gear 15 is in the coupled position, the elastic member 30 is pressed by the pinion gear 15, and the elastic member 30 slides in the recess 4e of the spool shaft 4. That is, as shown in FIG. 5, the elastic member 30 moves toward the third shaft portion 4c (left side in FIG. 5) together with the pinion gear 15, and the second abutting portion 15c of the pinion gear 15 abuts the first abutting portion 4d of the spool shaft 4. As a result, movement of the pinion gear 15 in the axial direction is prevented by the first abutting portion 4d, and the position of the pinion gear 15 in the axial direction is established. As a result, even when a load is applied to the pinion gear 15, meshing between the pinion gear 15 and the drive gear 14 is stable, and abrasion of the pinion gear 15 is suppressed.

OTHER EMBODIMENTS

One embodiment of the present invention is described above, but the present invention is not limited to the above-described embodiment, and various modifications can be made without departing from the scope of the invention. Specifically, the various embodiments and modified examples described in the present Specification can be combined in any manner according to necessity.

Figure 6:
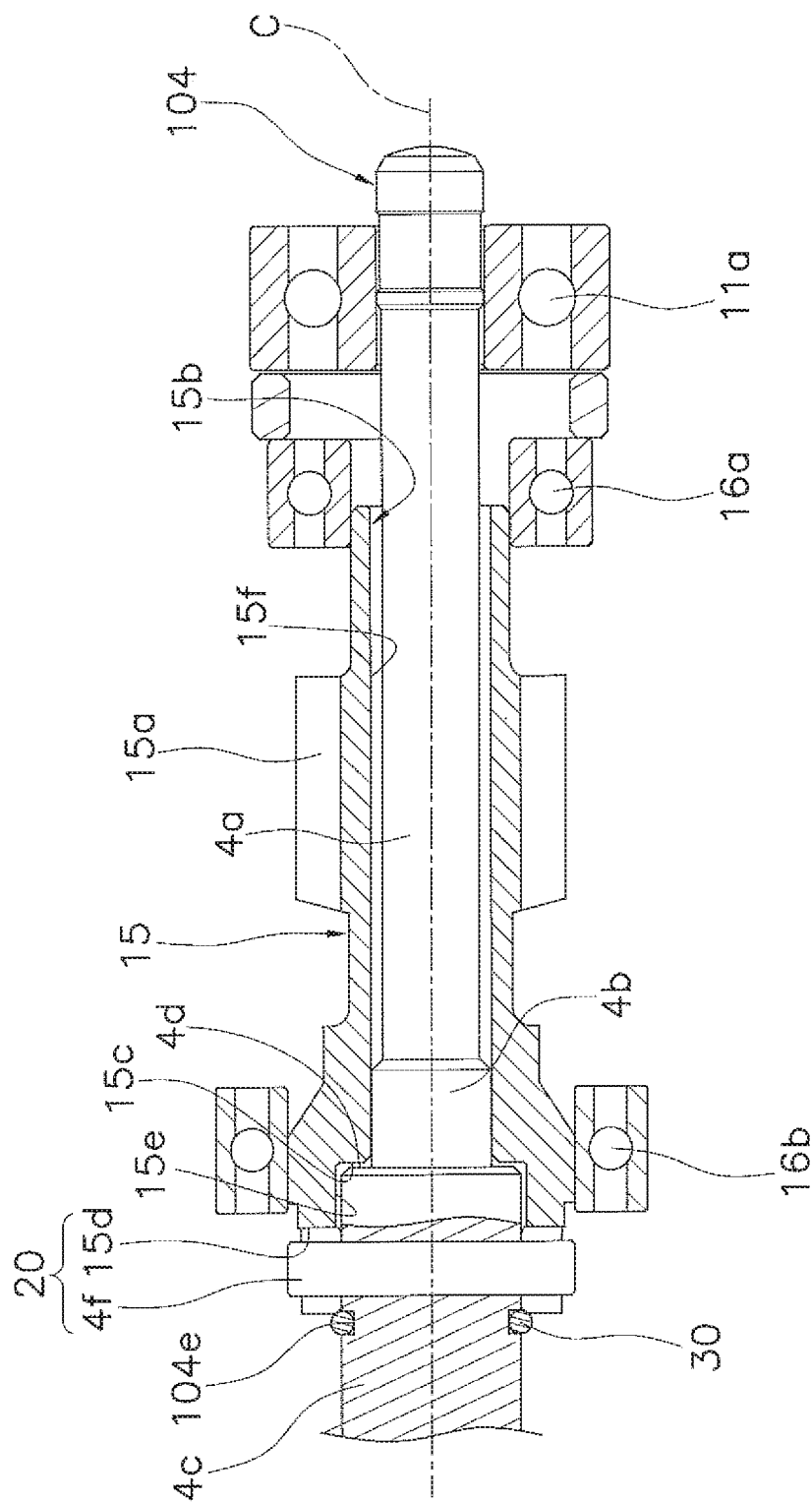
FIG. 6 shows a view corresponding to FIG. 3 according to another embodiment.

In the present embodiment, the inclined portion 4g is disposed in the recess 4e of the spool shaft 4, but it is not necessary for the inclined portion 4g to be disposed in the recess 4e. For example, as shown in FIG. 6, a bottom portion of a recess 104e of a spool shaft 104 can extend parallel to the axis C of the spool shaft 104.

What is claimed is:
1. A fishing reel, comprising:
a reel body;
a handle rotatable relative to the reel body;
a spool rotatable relative to the reel body;
a spool shaft connected to the spool so as to be integrally rotatable, and having a first abutting portion;
a clutch mechanism configured to transmit and prevent a rotational force from the handle to the spool;
a pinion gear configured such that the spool shaft extends through an inner circumferential portion thereof, configured to move in an axial direction of the spool shaft, between a coupled position in which the pinion gear is connected to the spool shaft so as to be integrally rotatable, and a decoupled position in which the connection with the spool shaft is disconnected, and having a second abutting portion configured to abut the first abutting portion in the axial direction in the inner circumferential portion; and an elastic member configured to contact a distal endmost surface of the pinion gear and bias the first abutting portion of the spool shaft and the second abutting portion of the pinion gear in directions away from each other, when the pinion gear is in the coupled position.

2. The fishing reel according to claim 1, wherein the second abutting portion of the pinion gear is a stepped portion disposed on the inner circumferential portion.

3. The fishing reel according to claim 1, wherein the elastic member is an O-ring.

4. The fishing reel according to claim 1, wherein the spool shaft has an engagement pin that protrudes in the radial direction, and the pinion gear has an engagement recess engaged by the engagement pin when in the coupled position.

5. A fishing reel, comprising:

a reel body;

a handle rotatable relative to the reel body;

a spool rotatable relative to the reel body;

a spool shaft connected to the spool so as to be integrally rotatable, and having a first abutting portion, and having a recess formed so as to be recessed in the radial direction;

a clutch mechanism configured to transmit and prevent a rotational force from the handle to the spool;

a pinion gear configured such that the spool shaft extends through an inner circumferential portion thereof, configured to move in an axial direction of the spool shaft, between a coupled position in which the pinion gear is connected to the spool shaft so as to be integrally rotatable, and a decoupled position in which the connection with the spool shaft is disconnected, and having a second abutting portion configured to abut the first abutting portion in the axial direction in the inner circumferential portion; and an elastic member configured to contact a distal end of the pinion gear and bias the first abutting portion of the spool shaft and the second abutting portion of the pinion gear in directions away from each other, when the pinion gear is in the coupled position, the elastic member being mounted in the recess.

6. The fishing reel according to claim 5, wherein the recess of the spool shaft has an inclined portion with an outer diameter gradually decreasing toward the coupled position, and the elastic member is slidable in the recess and is biased toward the decoupled position side by the inclined portion of the recess.

7. The fishing reel according to claim 5, wherein when the pinion gear is in the coupled position, the elastic member contacts an inner circumferential surface of a distal end of the pinion gear to bias the pinion gear radially outward.

* * * * *